(12) United States Patent
Chen

(10) Patent No.: US 9,147,951 B2
(45) Date of Patent: Sep. 29, 2015

(54) CARD CONNECTOR

(71) Applicant: DONGGUAN JITS INDUSTRIAL LIMITED, Dongguan (CN)

(72) Inventor: Huanyi Chen, Dongguan (CN)

(73) Assignee: DONGGUAN JITS INDUSTRIAL LIMITED, Donngguan, Guangdong (CN)

( * ) Notice: Subject to any disclaimer, the term of this patent is extended or adjusted under 35 U.S.C. 154(b) by 8 days.

(21) Appl. No.: 14/190,663

(22) Filed: Feb. 26, 2014

(65) Prior Publication Data

US 2015/0188246 A1    Jul. 2, 2015

(30) Foreign Application Priority Data

Dec. 31, 2013  (CN) .......................... 2013 1 0752632

(51) Int. Cl.
| | | |
|---|---|---|
| *H01R 13/00* | (2006.01) | |
| *H01R 12/70* | (2011.01) | |
| *H01R 13/629* | (2006.01) | |

(52) U.S. Cl.
CPC ...... *H01R 12/7005* (2013.01); *H01R 13/62933* (2013.01)

(58) Field of Classification Search
CPC .. H01R 13/6335; H01R 13/62; H01R 13/633; H01R 13/62933; H01R 43/26

USPC ................ 439/377, 153, 155, 157, 159, 160, 439/476.1, 483, 945, 946

See application file for complete search history.

(56) References Cited

U.S. PATENT DOCUMENTS

| | | | | |
|---|---|---|---|---|
| 7,794,232 B2 * | 9/2010 | Ogatsu | ............................ | 439/64 |
| 7,837,092 B2 * | 11/2010 | Wen | ............................... | 235/375 |
| 8,371,865 B1 * | 2/2013 | Su | ................................. | 439/155 |
| 8,597,038 B2 * | 12/2013 | Yokoyama et al. | ........... | 439/160 |
| 2013/0084724 A1 * | 4/2013 | Yokoyama et al. | ........... | 439/160 |

* cited by examiner

*Primary Examiner* — Neil Abrams
*Assistant Examiner* — Travis Chambers
(74) *Attorney, Agent, or Firm* — Shimokaji & Associates P.C.

(57) ABSTRACT

A card connector includes a body, multiple terminals accommodated and positioned in the body, a housing covering the body, and a containing space is defined by the housing and the body and extending along a length direction of the body, a card holder with a cooperating portion positioned in the containing space, and the card holder is capable of moving forward and backward in the containing space, and an adjusting element located at the front of the card connector, including a positioning portion arranged for positioning the adjusting element to the card connector, an actuating portion corresponding with the cooperating portion, and an operation portion. When the operation portion is driven, the actuating portion actuates the cooperating portion, thereby the card holder exiting from the containing space. The structure is simple, and takes up less space, which improves miniaturization progress of the card connector.

34 Claims, 9 Drawing Sheets

CARD CONNECTOR

RELATED APPLICATIONS

This application claims the benefit of priority to Chinese Patent Application No. 201310752632.9, filed on Dec. 31, 2013, which is hereby incorporated by reference in its entirety.

FIELD OF THE INVENTION

The present invention relates in general to a card connector, and more particularly to a movable card connector.

BACKGROUND OF THE INVENTION

Electronic card connectors of electronic devices are installed directly on a circuit board in the early, so a housing of the electronic device must be removed firstly to place an electronic card in the electronic card connector. While electronic card connectors of some electronic devices, such as mobile phones, are installed under batteries, in this case, the housing and the battery of the mobile phone all need to be removed sequentially, and then the electronic card can be placed in the electronic card connector, said removing and placing will bring a lot of trouble to consumers.

In order to comply with the development trend of simplifying electronic device, a drawer card connector appears recently, it usually includes an insulation body, multiple conductive terminals positioned at the insulation body, and a covering housing masking the insulation body. The insulation body and the covering housing coordinate with each other so as to form an accommodating space therebetween, and a sliding holder is accommodated in the accommodating space. An exiting mechanism is fixed on the insulation body for sliding the sliding holder forward and backward in the accommodating space. The exiting mechanism further includes a pop-up element, a pivoting element and a pushing rod, wherein, the pop-up element and the pivoting element are located at back of the insulation body, and at least part of the pop-up element exposes in the accommodating space and presses against the sliding holder elastically. The pivoting element has an actuating portion and a pushing portion, the pushing rod extends forward and backward at a side of the insulation body, a back end of the pushing rod presses against the pushing portion, a leading end of the pushing rod is extended to the front of the accommodating space.

The electronic device has an accommodating cavity defined at a side thereof, and the accommodating cavity has an opening communicating with outside, the drawer card connector is installed in the accommodating cavity, the electronic card can be placed in the drawer card connector without removing the housing of the electronic device. Just need pushing the leading end of the pushing rod with a tool that firstly enters into the opening, and the leading end of the pushing rod drives the back end of the pushing rod to press against the pushing portion backward, and then the pushing portion drives the actuating portion to rotate and thereby press against the sliding holder forward. Meanwhile, the pop-up element applies a forward thrust to the sliding holder, thereby the sliding holder exits outward, and then the electronic card can be put in the sliding holder, finally the sliding holder is pressed backward into the accommodating space, and the sliding holder can be positioned therein.

Though the exiting function of the drawer card connector is easy, which can overcome the removing and placing problem of the conventional electronic card connector, but it doesn't comply with the development trend of miniaturization and low cost for electronic devices nowadays, that is because the exiting mechanism includes three separate elements, the pop-up element, the pivoting element and the pushing rod, which are disposed at back of and a side of the insulation body respectively, and occupy much space of the insulation body, thereby prevent miniaturization progress of the drawer card connector. In addition, the processes of manufacturing and assembly are complex, which increase the cost of manufacturing, thereby fail to achieve the goal of low cost.

Hence, it is desired to provide a new card connector to overcome the above-mentioned drawbacks.

SUMMARY OF THE INVENTION

The objective of the present invention is to provide a card connector with low cost, which is easy to manufacture and assemble.

The above objective is achieved by providing a card connector, including a body; multiple terminals accommodated and positioned in the body, each of the terminals having a contacting portion; a housing covering the body, a containing space with an access opening being defined by the housing and the body and extending along a length direction of the body, and the access opening being located at front of the body; a card holder positioned in the containing space and having at least one accommodating space communicated with the containing space, the terminals being exposed in the accommodating space, the card holder being capable of moving forward and backward in the containing space; and an adjusting element, comprising a positioning portion arranged for positioning the adjusting element in the front of the card connector, an actuating portion, and an operation portion, when the operation portion being driven, the actuating portion rotating around the positioning portion and actuating the card holder forward, thereby the card holder exiting from the containing space.

Preferably, the card holder has a cooperating portion corresponding with the actuating portion, and the cooperating portion is driven by the actuating portion.

Preferably, at least one fixing portion is provided at the front of the housing, and the positioning portion is positioned at the fixing portion.

Preferably, the fixing portion includes a base portion, at least one upper stopper and at least one lower stopper extending from the base portion, and a gap is formed between the upper stopper and the lower stopper for allowing the positioning portion to pass, and the upper stopper and the lower stopper are arranged for preventing upward and downward movement of the positioning portion.

Preferably, a back stopper is extended downward from the base portion, which is arranged for preventing backward movement of the positioning portion.

Preferably, the back stopper is formed by riveting pressing the base portion.

Preferably, the card connector further including a side stopper connecting with the base portion and the lower stopper, and the side stopper being arranged for preventing excessive rotation of the positioning portion.

Preferably, the side stopper is pressed against a side of the adjusting element.

Preferably, a back stopper is extended downward from the base portion and angled with the side stopper.

Preferably, two lower stoppers are located at two sides of the upper stopper respectively, and two side stoppers are connected with the base portion respectively, two side stoppers and the back stopper are arranged in a form of triangle.

Preferably, the upper stopper is extended forward from the base portion, and the lower stopper is extended downward from the side stopper.

Preferably, the gap is formed by splitting the upper stopper and the lower stopper.

Preferably, the upper stopper and the base portion are in the same plane.

Preferably, two lower stoppers are located at two sides of the upper stopper respectively and arranged in the same plane.

Preferably, a positioning shaft is formed by extending downward from the upper stopper, and a through hole is opened in the positioning portion, the positioning shaft of the upper stopper is inserted in the through hole of the positioning portion; or a positioning shaft is formed by extending upward from the positioning portion, and a through hole is opened in the upper stopper, the positioning shaft of the positioning portion is inserted in the through hole of the upper stopper.

Preferably, the positioning shaft is formed by riveting pressing the upper stopper.

Preferably, the upper stopper is tapered forward from the base portion.

Preferably, a front stopper is formed by extending downward from a front end of the upper stopper, for preventing excessive forward movement of the positioning portion.

Preferably, the front stopper is connected with the lower stopper via a connection portion.

Preferably, the connection portion is inclined forward.

Preferably, a protuberance is formed by extending upward from the lower stopper, and a hole is opened in the positioning portion, the protuberance of the lower stopper is inserted in the hole of the positioning portion; or a protuberance is formed by extending downward from the positioning portion, and a hole is opened in the lower stopper, the protuberance of the positioning portion is inserted into in the hole of the lower stopper.

Preferably, a plane of the upper stopper is higher than that of the base portion, and a plane of the lower stopper is lower than or parallel to that of the base portion.

Preferably, the housing includes a top wall and two side walls extended downward from two sides of the top wall respectively, at least one side wall is connected with the fixing portion at the front thereof.

Preferably, the fixing portion comprises a base portion, at least one upper stopper and at least one lower stopper extending from the base portion, and a gap is formed between the upper stopper and the lower stopper for allowing the positioning portion to pass, and the upper stopper and the lower stopper are arranged for preventing upward and downward movement of the positioning portion, the base portion, the upper stopper and the lower stopper are parallel to the top wall.

Preferably, the actuating portion is formed by extending firstly upward and then horizontally from one end of the positioning portion, and presses against the cooperating portion.

Preferably, the operation portion further includes a contacting portion and a pushing portion, the contacting portion is formed by extending firstly upward and then horizontally from one end of the positioning portion, and the pushing portion is formed by extending upward from one end of the contacting portion.

Preferably, the contacting portion is configured horizontally and perpendicular to the pushing portion.

Preferably, the housing includes a top wall and two side walls extended downward from two sides of the top wall respectively, the pushing portion is formed at an acute angle to the side wall in a overhead view.

Preferably, the operation portion is located outside the housing.

The present invention provides another card connector, including a body; multiple terminals accommodated and positioned in the body; a housing covering the body, a containing space with an access opening being defined by the housing and the body and extending along a length direction of the body, and the access opening being located at front of the body; a card holder with a cooperating portion positioned in the containing space, the card holder being capable of moving forward and backward in the containing space; and an adjusting element in an integrated structure, comprising a positioning portion arranged for positioning the adjusting element in the front of the card connector, an actuating portion corresponding with the cooperating portion, and an operation portion, when the operation portion being driven, the actuating portion actuating the cooperating portion, thereby the card holder exiting from the containing space.

The present invention provides a third card connector, including a body; multiple terminals accommodated and positioned in the body; a housing covering the body, a containing space with an access opening being defined by the housing and the body and extending along a length direction of the body, and the access opening being located at front of the body; a card holder with a cooperating portion positioned in the containing space, the card holder being capable of moving forward and backward in the containing space; and an adjusting element located at the front of the card connector, comprising a positioning portion arranged for positioning the adjusting element to the card connector, an actuating portion corresponding with the cooperating portion, and an operation portion, when the operation portion being driven, the actuating portion actuating the cooperating portion, thereby the card holder exiting from the containing space.

In comparison with the prior art, the card connector of the present invention has several effects as follow:

The adjusting element only includes the actuating portion, the positioning portion and the operation portion, the structure of which is simple, and the adjusting element is positioned at the front of the card connector via the positioning portion, thereby takes up less space, and improves miniaturization progress of the card connector. In addition, due to the simple structure of the adjusting element, the processes of manufacture and assembly are also simple, thereby the manufacture cost reduces.

In addition, the actuating portion matches with the cooperating portion, just operating the operation portion, the actuating portion rotates around the positioning portion and drive cooperating portion of the card holder forward, thereby at least part of the card holder exits from the containing space, and then the electronic card can be put into the card connector, it is thus clear that the exiting process is easy, and said structure meets the development trend of simplification, miniaturization and low cost of the electronic device.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION OF ILLUSTRATED EMBODIMENTS

In order to describe the technical solutions, structure features, purpose and effect to achieve of the present invention in detail, various preferred embodiments will now be described with reference to the Figures.

Figure 1:
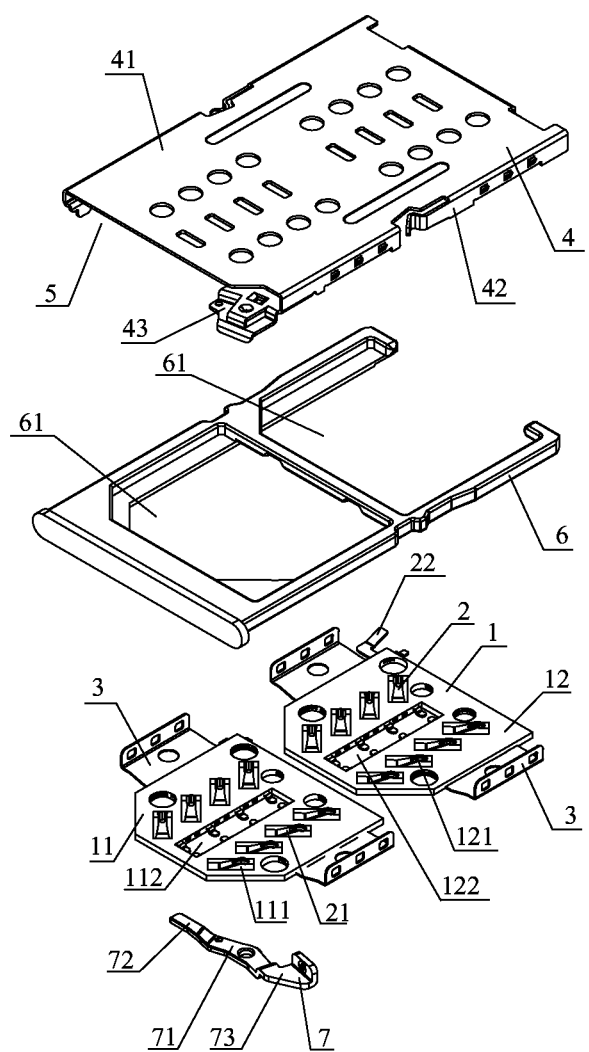
FIG. 1 is an exploded view of a card connector of the present invention.
Figure 2:
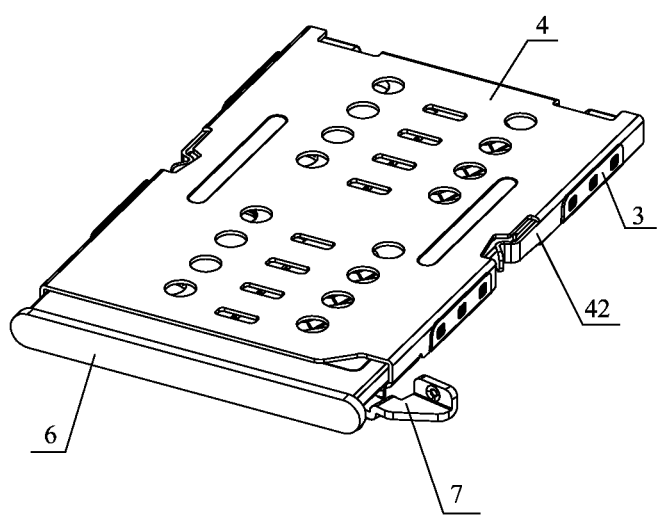
FIG. 2 is a perspective view of the card connector of the present invention.

As shown in FIG. 1, the present invention provides a card connector used for connecting two electronic cards (not shown) to a circuit board (not shown) conductively, the card connector includes a body 1; multiple terminals 2 accommodated and positioned in the body 1; multiple metal elements 3 fastened to the body 1 so as to fix the body 1 to the circuit board; a housing 4 covering the body 1, the housing 4 and the body 1 match with each other so as to form a containing space 5; a card holder 6 movably accommodated in the containing space 5; an adjusting element 7 positioned on the card connector for actuating the card holder 6 in the containing space 5. Of course, in other embodiments, the number of the electronic card can be one or more than two.

Figure 4:
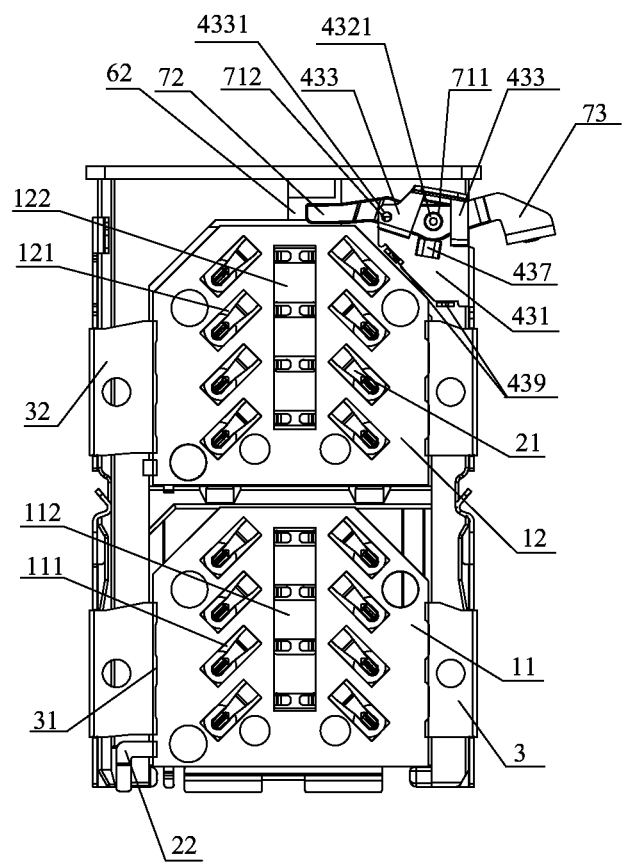
FIG. 4 is an upward view of the card connector of the present invention.

Referring to FIGS. 1 and 4, the body 1 includes a first body 11 at the front and a second body 12 at the back, multiple first accommodating slots 111 are opened in the first body 11 and arranged in two rows, and multiple second accommodating slots 121 are opened in the second body 12 and arranged in two rows. A first through slot 112 is opened in the first body 11 and located between the two rows of the first accommodating slots 111, and a second through slot 122 is opened in the second body 12 and located between the two rows of the second accommodating slots 121. Of course, in other embodiments, the first body 11 and the second body 12 can be formed integrally, the number of the first through slot 112 and the second through slot 122 can be more than one, or the first through slot 112 and the second through slot 122 can be omitted.

Referring to FIG. 1, said multiple terminals 2 includes multiple conductive terminals 21 and a switch terminal 22.

Figure 7:
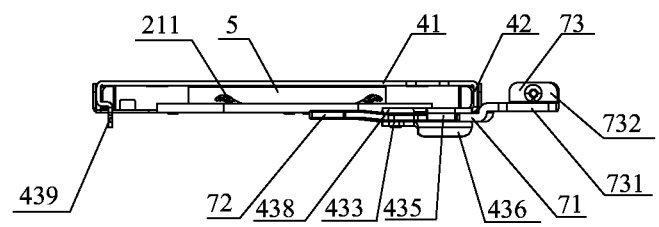
FIG. 7 is a front view of the FIG. 5.

Referring to FIGS. 1, 4 and 7, each of the first accommodating slots 111 and the second accommodating slots 121 has a conductive terminal 21 fixed therein, each conductive terminal 21 has a contacting portion 211 and a soldering portion 212. The contacting portions 211 are exposed in the first accommodating slots 111 and the second accommodating slots 121 respectively, and extend upward so as to be higher than the top surface of the first body 11 and the second body 12. The soldering portions 212 are exposed in the first through slot 112 and the second through slot 122 respectively, and extend downward so as to be soldered to the circuit board. Of course, in other embodiments, the contacting portion 211 can be lower than or parallel to the top surface of the first body 11 and the second body 12, and the soldering portions 212 can be higher than or parallel to the bottom surface of the first body 11 and the second body 12, that is, the soldering portions 212 can be disposed in any form as long as it can be soldered or connected conductively to the circuit board.

Figure 6:
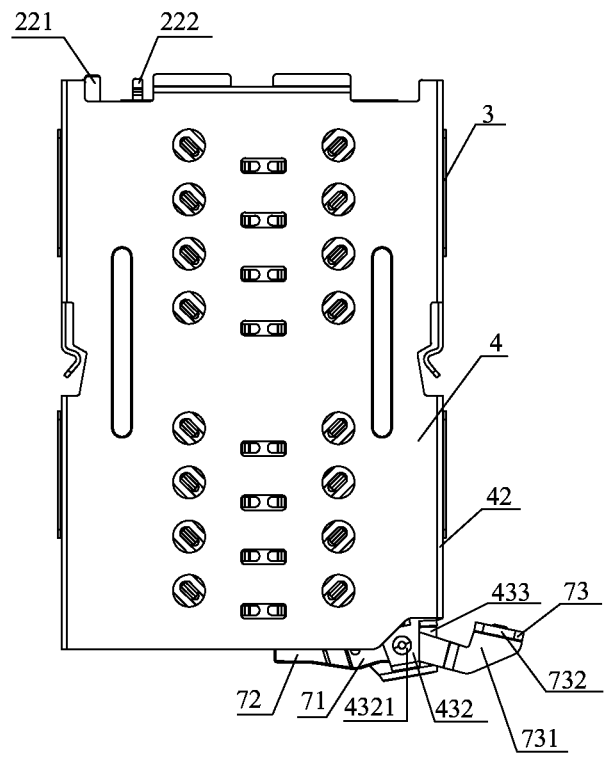
FIG. 6 is a top view of the FIG. 5.

Referring to FIGS. 1, 6, the switch terminal 22 is fixed at the back of the second body 12, the switch terminal 22 has a first contacting terminal 221 and a second contacting terminal 222 extended outward from the second body 12, the first contacting terminal 221 is contacted with the card holder 6, and the second contacting terminal 222 is soldered to the circuit board. Of course, in other embodiments, the switch terminal 22 can be fixed at any position of the first body 11 and the second body 12 as long as it has detecting function.

Figure 5:
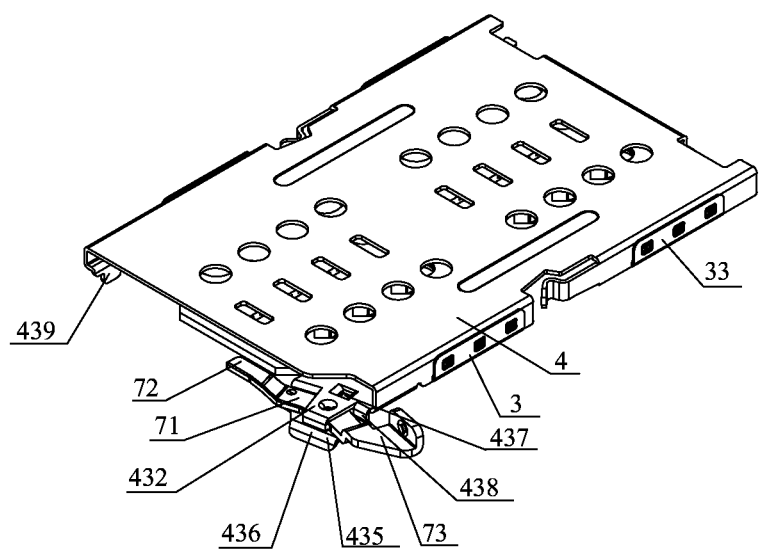
FIG. 5 is a perspective view of a housing and an adjusting element installed on the housing of the card connector of the present invention.
Figure 8:
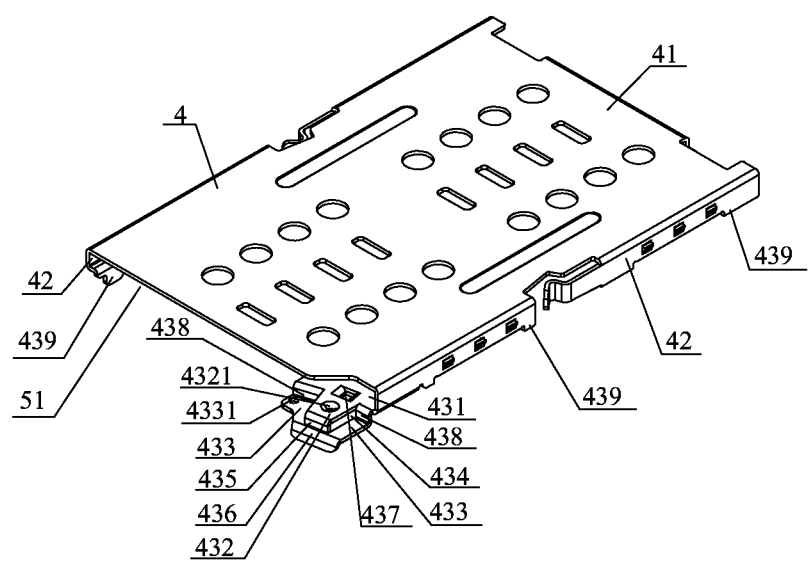
FIG. 8 is a perspective view of the housing of the card connector of the present invention.
Figure 9:
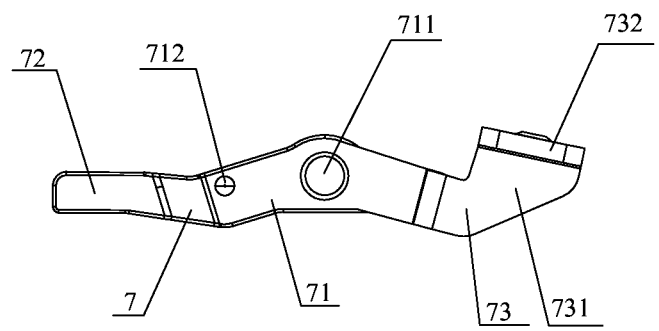
FIG. 9 is a top view of the adjusting element of the card connector of the present invention.
Figure 10:
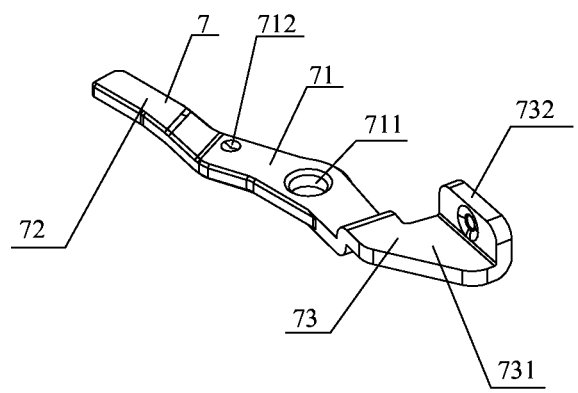
FIG. 10 is a perspective view of the adjusting element of the card connector of the present invention.

Referring to FIGS. 4, 5, and 8, each metal element 3 includes a first fixed portion 31, a second fixed portion 32 and a third fixed portion 33. The first fixed portions 31 are fixed to the first body 11 and the second body 12. The second fixed portions 32 extend outward from the first body 11 and the second body 12 so as to be soldered with the circuit board, thereby the first body 11 and the second body 12 are be fixed to the circuit board, due to the surface contact of the second fixed portion 32 and the circuit board, the connection therebetween is very stable. The third fixed portion 33 is generally perpendicular to the second fixed portion 32 and fixed with the housing 4. Multiple metal elements 3, multiple conductive terminals 21 and the switch terminal 22 are formed integrally with the first body 11 and the second body 12 via the process of plug-in molding, that is, Multiple metal elements 3, multiple conductive terminals 21 and the switch terminal 22 are inserted into a mold that is used for forming the first body 11 and the second body 12 during a process of injection molding, the manufacturing process is simple, thus the cost comes down. Of course, in other embodiments, the number of the metal element 3 can be just one, as long as it can fix the first body 11 and the second body 12 to the circuit board.

Referring to FIGS. 1, and 4, the housing 4 has a top wall 41 and two side walls 42 extended downward from two sides of the top wall 41 respectively, the third fixed portions 33 match with and are fixed to the side walls 42, a fixing portion 43 arranged for positing the adjusting element 7 is located at the front of one side wall 42, thereby takes up less space of a product. The top wall 41, the side walls 42, the first body 11 and the second body 12 match with each other so as to form a containing space 5 therebetween, the containing space 5 with an access opening 51 extends forward and backward, and the access opening 51 being defined at the front of the first body 11. Multiple holes (not signed) are opened in the top wall 41 corresponding to multiple first accommodating slot 111, multiple second accommodating slot 121, the first through slot 112 and the second through slot 122 respectively, the holes can be used for observing the accuracy of positions of multiple contacting portions 211, and soldering effect of soldering points of multiple soldering portions 212 and the circuit board.

Referring to FIGS. 5, and 8, the fixing portion 43 includes a base portion 431, an upper stopper 432 and two lower stoppers 433, the upper stopper 432 is tapered forward from the base portion 431, the upper stopper 432 and the base portion 431 are in the same plane, while the plane of the lower stopper 433 is lower than that of the base portion 431, two lower stoppers 433 are located at two sides of the upper stopper 433 respectively and arranged in the same plane. A gap 434 disposed between the upper stopper 432 and the lower stopper 433 is formed by splitting the upper stopper 432 and the lower stopper 433. The base portion 431, the upper stopper 432 and the lower stopper 433 are generally parallel to the top wall 41. A positioning shaft 4321 is formed by extending downward from the upper stopper 432, preferably, the positioning shaft 4321 is formed by riveting pressing the upper stopper 432, and a hole 4331 is opened in the lower stopper 433. Of course, in other embodiments, the plane of the upper stopper 432 can be higher than that of the base portion 431, and the plane of the lower stopper 433 is lower than or parallel to that of the base portion 431. While the through hole 711 is opened in the upper stopper 432, and the protuberance 712 is formed by extending upward from the lower stopper 433, the structure mentioned-above is simple.

Referring to FIGS. 4 to 8, a front stopper 435 is formed by extending downward from a front end of the upper stopper 432, the front stopper 435 is connected with the lower stopper 433 via a connection portion 436, the connection portion 436 is inclined forward so as to guide the card holder 6 into the containing space 5, moreover, it is easy to form. A back stopper 437 is formed by extending downward from the base portion 431, preferably, the back stopper 437 is formed by riveting pressing the base portion 431. Two side stoppers 438 are connected two lower stopper 433 to the base portion 431 respectively, two side stoppers 438 and the back stopper 437 are arranged in a form of triangle.

Referring to FIG. 8, two location feet 439 are extended from the edge of the base portion 431 of the fixing portion 43, and the opposite side wall 42 of the fixing portion 43 also has a location foot 439, the location feet 439 are soldered with the circuit board so as to fix the housing 4 to the circuit board. Of course, in other embodiments, the number of the location feet 439 is changed on demand.

Figure 3:
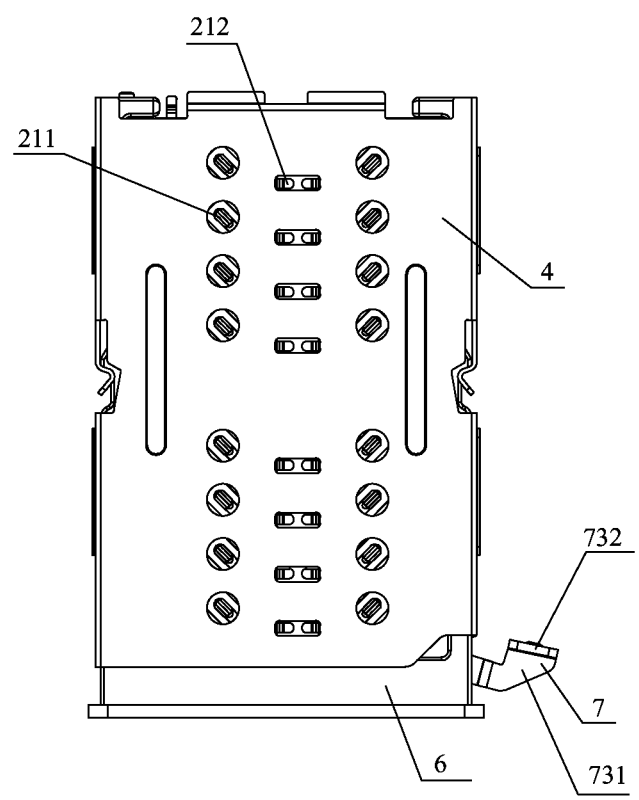
FIG. 3 is a top view of the card connector of the present invention.

Referring to FIGS. 1, 3, and 4, the card holder 6 is made of metal conductive material, the first contacting portion 221 is connected conductively with the card holder 6, the card holder 6 is accommodated in the containing space 5 and is capable of moving forward and backward in the containing space 5, the card holder 6 has two accommodating spaces 61 for carrying two electronic cards, the accommodating spaces 61 are communicated with the containing space 5, the first accommodating slots 111 and the second accommodating slot 121, multiple contacting portions 211 are exposed in the accommodating spaces 61 so as to connect conductively two electronic card. The card holder 6 has a cooperating portion 62 configured at the middle position of the front end thereof, the cooperating portion 62 is a recess opened at the bottom surface of the seat card 6. Of course, in other embodiments, the cooperating portion 62 can be omitted, and then the actuating portion 72 presses against the flange of the card holder 6, as long as the actuating portion 72 can actuate the card holder 6, the position that the actuating portion 72 presses the card holder 6 is not limited, the number of the accommodating spaces 61 can be one or more than two; the card holder 6 can be made of plastic material or non-conducting material, in this way, the first contacting terminal 221 of the switch terminal 22 can be connected conductively to the card holder 6 by other method, thereby realizes detecting function, or the first contacting terminal 221 connects with the circuit board directly by the pressing of the card holder 6, thereby realizes detecting function.

Referring to FIGS. 4 to 10, the adjusting element 7 includes a positioning portion 71 arranged for positioning the adjusting element 7 in the front of the card connector, the positioning portion 71 is positioned in the fixing portion 43 and concretely accommodated in the gap 434. The upper stopper 432 and the lower stopper 433 are arranged for preventing upward and downward movement of the positioning portion 71, the front stopper 435 is arranged for preventing forward movement of the positioning portion 71, the back stopper 437 is arranged for preventing backward movement of the positioning portion 71, the side stoppers 438 are arranged for preventing excessive rotation of the positioning portion 71, the adjusting element 7 can rotate to such a position that a side of the positioning portion 71 presses against the side stopper 438. Of course, in other embodiments, the adjusting element 7 can be fixed to the first body 11 or the metal element 3, even can be fixed to the card holder 6 or the circuit board, as long as the adjusting element 7 can drive the card holder 6 to exit from the containing space 5.

Referring to FIGS. 4 to 10, a through hole 711 corresponding to the positioning shaft 4321 of the upper stopper 432 is opened in the positioning portion 71, the positioning shaft 4321 is inserted in the through hole 711, a protuberance 712 corresponding to the hole 4331 of the lower stopper 433 is formed by extending downward from the positioning portion 71, the protuberance 712 is inserted in the hole 4331. Of course, in other embodiments, the through hole 711 can be opened in the upper stopper 432, correspondingly, the positioning shaft 4321 is formed by extending upward from the positioning portion 71 and is inserted in the through hole 711; the protuberance 712 can be formed by extending upward from the lower stopper 433, correspondingly, the hole 4331 is opened in the positioning portion 71, the protuberance 712 is inserted in the hole 4331. The fixing cooperation of the positioning shaft 4321 and the through hole 711, and the fixing cooperation of the protuberance 712 and the hole 4331 are simple during manufacturing and assemble process.

Referring to FIGS. 4 and 7, an actuating portion 72 is formed by extending firstly upward and then horizontally from one end of the positioning portion 71, the actuating portion 72 is located in the card connector and presses against the cooperating portion 62.

Figure 11:
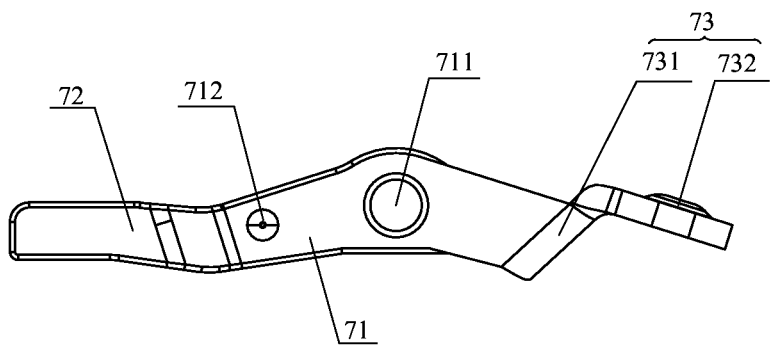
FIG. 11 is another top view of the adjusting element of the card connector of the present invention.
Figure 12:
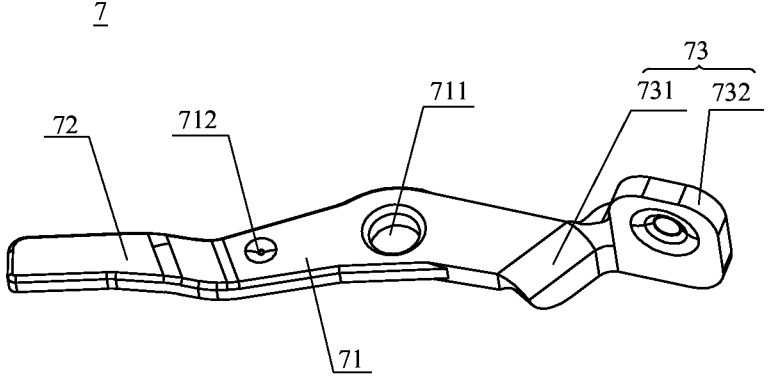
FIG. 12 is another perspective view of the adjusting element of the card connector of the present invention.

Referring to FIGS. 3, 4 and 7, the adjusting element 7 has an operation portion 73, the operation portion 73 further comprises a contacting portion 731 and a pushing portion 732, the contacting portion 731 is formed by extending firstly upward and then horizontally from one end of the positioning portion 71, and the pushing portion 732 is formed by extending upward from one end of the contacting portion 731, the contacting portion 731 and the pushing portion 732 are located outside the card connector. The contacting portion 731 is configured horizontally and perpendicular to the pushing portion 732. The pushing portion 732 is formed at an acute angle to the side wall 42 in a overhead view, at least part of the positioning portion 71, the actuating portion 72 and the operation portion 73 of the adjusting element 7 are exposed outside the housing 4, wherein, the positioning portion 71 and the actuating portion 72 are located under the front end of the card holder 6, and the operation portion 73 is extended outward and exposed outside the housing 4 entirely. when the operation portion 73 is driven, the actuating portion 72 rotates around the positioning portion 71 and drives the card holder 6 forward, thereby at least part of the card holder 6 exits from the containing space 5 from the access opening 51. Of course, in other embodiments, the contacting portion 731 can be arranged vertically or obliquely, as shown in FIG. 11-12, the pushing portion 732 is still arranged vertically and connected to the back end of the contacting portion 731.

Referring to FIGS. 1 to 4, when assembling the card connector mentioned-above, firstly, Multiple metal elements 3, multiple conductive terminals 21 and the switch terminal 22 that are connected with each other by multiple material straps are formed in the first body 11 and the second body 12 integrally via a process of injection molding, wherein multiple said contacting portions 211 are exposed in the first accommodating slots 111 and the second accommodating slots 121 respectively, multiple said soldering portions 212 are exposed in the first through slot 112 and the second through slot 122 respectively, the first contacting terminal 221, the second contacting terminal 222, multiple the second fixed portion 32 and multiple the third fixed portion 33 are located outside the second body 12. Secondly, removing the material straps. In sum, the manufacturing process mentioned-above is simple, thereby the production efficiency is improved, and due to injection molding, components thereof can match with each other firmly without special construction for fixing, so the physical design is also simple.

Thirdly, installing the housing 4 above the first body 11 and the second body 12, the side walls 42 are cooperated and fixed with multiple third fixed portions 33, thereby the containing space 5 forms.

Fourthly, the adjusting element 7 is inserted in the gap 434 of the fixing portion 43 from a side thereof, the positioning shaft 4321 is inserted in the through hole 711, the protuberance 712 is inserted in the hole 4331, and the operation portion 73 is located outside the housing 4. The upper stopper 432, the lower stopper 433, the front stopper 435 and the back stopper 437 are arranged for preventing upward, downward, forward and backward movement of the positioning portion 71 respectively, the side stopper 438 is arranged for preventing excessive rotation of the positioning portion 71, thus the adjusting element 7 is positioned accurately.

Sixthly, the card holder 6 is inserted into the containing space 5 through the access opening 51 and slides backward into the containing space 5 until that the card holder 6 presses against the first contacting terminal 221, the actuating portion 72 engages in the cooperating portion 62, and part of the front end of the card holder 6 is exposed outside the housing 4. Now, the actuating portion 72 presses against the back of the cooperating portion 62, and one of the side stopper 438 presses against the corresponding side of the positioning portion 71 so as to stop the positioning portion 71.

Finally, installing the assembled card connector on the circuit board, multiple soldering portions 212, the second contacting terminal 222, multiple the second fixed portions 32 and multiple location feet 439 are respectively soldered to the circuit board, thereby the card connector is fixed to the circuit board firmly.

In sum, when one or two electronic card(s) need(s) to be put into the accommodating space 61, operating the operation portion 73 with a tool, a part of the tool leans against the contacting portion 731, and another part of the tool presses against the pushing portion 732, and then the actuating portion 72 rotates around the positioning portion 71 and drive the cooperating portion 62 forward, as a result, at least part of the card holder 6 can exit from the containing space 5, thereby the electronic card(s) can be installed therein, the structure for exiting the card holder 6 is simple and takes up less space of the card connector, at the same time, is easy to operate. When the operation portion 73 rotates to a termination position, the actuating portion 72 presses against the front of the cooperating portion 62, in addition, another side stopper 438 presses against the corresponding side of the positioning portion 71 so as to stop the positioning portion 71.

The card connector of the present invention has some beneficial effects as follow:

(1) The adjusting element 7 only includes the actuating portion 72, the positioning portion 71 and the operation portion 73, which has simple structure and is positioned at the front of the card connector by the positioning portion 71, thereby less space is token up, so as to improve miniaturization progress of the card connector. In addition, due to the simple structure of the adjusting element, the processes of manufacture and assembly are also simple, thereby the manufacture cost reduces.

In addition, the actuating portion 72 matches with the cooperating portion 62, just operating the operation portion 73, the actuating portion 72 will rotate around the positioning portion 71 and drive the cooperating portion 62 of the card holder 6 forward, thereby at least part of the card holder 6 exits from the containing space 5, and then put the electronic card into the card connector, it is thus clear that the exiting process is easy, and said structure meets the development trend of simplification, miniaturization and low cost of the electronic device.

(2) Multiple soldering portions 212 are exposed in the first through slots 112 and the second through slots 122 respectively and extend downward so as to be soldered to the circuit board, manufacturers or users can observe the soldering effect through the first through slots 112 and the second through slots 122. In addition, the containing space 5 and the accommodating space 61 are communicated with the first through slots 112 and the second through slots 122, thereby the heat dissipation thereof is good.

(3) The upper stopper 432 is tapered forward from the base portion 431, that is, the width of the upper stopper 432 is the widest at the joint position of the upper stopper 432 and the base portion 431, thus the strength of the upper stopper 432 is improved, which can prevent damage of the upper stopper 432 by the adjusting element 7 during operation process.

(4) The upper stopper 432 and the base portion 431 are in the same plane, two lower stoppers 433 are arranged in the same plane, and the gap 434 is formed by splitting the upper stopper 432 and the lower stopper 433, the forming of the gap is simple.

(5) The base portion 431, the upper stopper 432 and the lower stopper 433 are parallel to the top wall 41, this structure is beneficial to control the size of the product and can eliminate defective products, and is convenient to operate the adjusting element 7.

(6) The back stopper 437 is angled with side stoppers 438, and two side stoppers 438 and the back stopper 437 are arranged in a form of triangle, a side of the adjusting element 7 is positioned in this triangle of the fixing portion 43, while the side stopper 438 and the back stopper 437 are configured individually without connection, this structure can prevent the strength of the fixing portion 43 from weakening.

(7) The contacting portion 731 is configured horizontally and perpendicular to the pushing portion 732, this structure is beneficial for a part of the tool to lean against the contacting portion 731 and another part of the tool to press against the pushing portion 732. When the card holder 6 is accommodated in the containing space 5, the pushing portion 732 is formed at an acute angle to the side wall 42 in a overhead view, when said another part of the tool presses against the pushing portion 732 to rotate anticlockwise, the card holder 6 can slides forward and exits from the containing space 5, the tool won't slip, when the operation portion 73 rotates to the termination position, the pushing portion 732 is perpendicular to the side wall 42.

(8) At least part of the positioning portion 71, the actuating portion 72 and the operation portion 73 of the adjusting element 7 are exposed outside the housing 4, wherein, the positioning portion 71 and the actuating portion 72 are located under the front end of the card holder 6, and the operation portion 73 is extended outward and exposed outside the housing 4 entirely, the contacting portion 731 and the pushing portion 732 are located outside the card connector, which take up less space of the card connector, meet the development trend of miniaturization.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A card connector, comprising:
    a body;
    multiple terminals accommodated and positioned in the body, each of the terminals having a contacting portion;
    a housing covering the body, a containing space with an access opening being defined by the housing and the body and extending along a length direction of the body, and the access opening being located at front of the body;
    a card holder positioned in the containing space and having at least one accommodating space communicated with the containing space, the terminals being exposed in the accommodating space, the card holder being capable of moving forward and backward in the containing space; and
    an adjusting element, comprising a positioning portion arranged for positioning the adjusting element in the front of the card connector, an actuating portion, and an operation portion, when the operation portion being driven, the actuating portion rotating around the positioning portion and actuating the card holder forward, thereby the card holder exiting from the containing space;
    wherein at least one fixing portion is provided at the front of the housing, and the positioning portion is positioned at the fixing portion, the fixing portion comprises a base portion, at least one upper stopper and at least one lower stopper extending from the base portion, and a gap is formed between the upper stopper and the lower stopper for allowing the positioning portion to pass, and the upper stopper and the lower stopper are arranged for preventing upward and downward movement of the positioning portion.

2. The card connector according to claim 1, wherein the upper stopper is extended forward from the base portion, and the lower stopper is extended downward from the side stopper.

3. The card connector according to claim 1, wherein the gap is formed by splitting the upper stopper and the lower stopper.

4. The card connector according to claim 1, wherein the upper stopper and the base portion are in the same plane.

5. The card connector according to claim 1, wherein two lower stoppers are located at two sides of the upper stopper respectively and arranged in the same plane.

6. The card connector according to claim 1, wherein the upper stopper is tapered forward from the base portion.

7. The card connector according to claim 1, wherein a protuberance is formed by extending upward from the lower stopper, and a hole is opened in the positioning portion, the protuberance of the lower stopper is inserted in the hole of the positioning portion; or a protuberance is formed by extending downward from the positioning portion, and a hole is opened in the lower stopper, the protuberance of the positioning portion is inserted into in the hole of the lower stopper.

8. The card connector according to claim 1, wherein a plane of the upper stopper is higher than that of the base portion, and a plane of the lower stopper is lower than or parallel to that of the base portion.

9. The card connector according to claim 1, wherein a back stopper is extended downward from the base portion, which is arranged for preventing backward movement of the positioning portion.

10. The card connector according to claim 9, wherein the back stopper is formed by riveting pressing the base portion.

11. The card connector according to claim 1, further comprising a side stopper connecting with the base portion and the lower stopper, and the side stopper being arranged for preventing excessive rotation of the positioning portion.

12. The card connector according to claim 11, wherein the side stopper is pressed against a side of the adjusting element.

13. The card connector according to claim 11, wherein a back stopper is extended downward from the base portion and angled with the side stopper.

14. The card connector according to claim 13, wherein two lower stoppers are located at two sides of the upper stopper respectively, and two side stoppers are connected with the base portion respectively, two side stoppers and the back stopper are arranged in a form of triangle.

15. The card connector according to claim 1, wherein a positioning shaft is formed by extending downward from the upper stopper, and a through hole is opened in the positioning portion, the positioning shaft of the upper stopper is inserted in the through hole of the positioning portion; or a positioning shaft is formed by extending upward from the positioning portion, and a through hole is opened in the upper stopper, the positioning shaft of the positioning portion is inserted in the through hole of the upper stopper.

16. The card connector according to claim 15, wherein the positioning shaft is formed by riveting pressing the upper stopper.

17. The card connector according to claim 1, wherein a front stopper is formed by extending downward from a front end of the upper stopper, for preventing excessive forward movement of the positioning portion.

18. The card connector according to claim 17, wherein the front stopper is connected with the lower stopper via a connection portion.

19. The card connector according to claim 18, wherein the connection portion is inclined forward.

20. The card connector according to claim 1, wherein the housing comprises a top wall and two side walls extended downward from two sides of the top wall respectively, at least one side wall is connected with the fixing portion at the front thereof.

21. The card connector according to claim 20, wherein the fixing portion comprises a base portion, at least one upper stopper and at least one lower stopper extending from the base portion, and a gap is formed between the upper stopper and the lower stopper for allowing the positioning portion to pass, and the upper stopper and the lower stopper are arranged for preventing upward and downward movement of the positioning portion, the base portion, the upper stopper and the lower stopper are parallel to the top wall.

22. The card connector according to claim 1, wherein the card holder has a cooperating portion corresponding with the actuating portion, and the cooperating portion is driven by the actuating portion.

23. The card connector according to claim 22, wherein the actuating portion is formed by extending firstly upward and then horizontally from one end of the positioning portion, and presses against the cooperating portion.

24. The card connector according to claim 1, wherein the operating portion further comprises a contacting portion and a pushing portion, the contacting portion is formed by extending firstly upward and then horizontally from one end of the positioning portion, and the pushing portion is formed by extending upward from one end of the contacting portion.

25. The card connector according to claim 24, wherein the contacting portion is configured horizontally and perpendicular to the pushing portion.

26. The card connector according to claim 24, wherein the housing comprises a top wall and two side walls extended downward from two sides of the top wall respectively, the pushing portion is formed at an acute angle to the side wall in a overhead view.

27. The card connector according to claim 24, wherein the operation portion is located outside the housing.

28. A card connector, comprising:
a body;
multiple terminals accommodated and positioned in the body, each of the terminals having a contacting portion;
a housing covering the body, a containing space with an access opening being defined by the housing and the body and extending along a length direction of the body, and the access opening being located at front of the body;
a card holder positioned in the containing space and having at least one accommodating space communicated with the containing space, the terminals being exposed in the accommodating space, the card holder being capable of moving forward and backward in the containing space; and
an adjusting element, comprising a positioning portion arranged for positioning the adjusting element in the front of the card connector, an actuating portion, and an operation portion, when the operation portion being driven, the actuating portion actuating the card holder forward, thereby the card holder exiting from the containing space;
wherein at least one fixing portion is provided at the front of the housing, and the positioning portion is positioned at the fixing portion, the housing comprises two side walls, at least one side wall is connected with the fixing portion at the front thereof.

29. The card connector according to claim 28, wherein the fixing portion comprises a base portion, at least one upper stopper and at least one lower stopper extending from the base portion, and a gap is formed between the upper stopper and the lower stopper for allowing the positioning portion to pass, and the upper stopper and the lower stopper are arranged for preventing upward and downward movement of the positioning portion.

30. A card connector, comprising:
a body;
multiple terminals accommodated and positioned in the body, each of the terminals having a contacting portion;
a housing covering the body, a containing space with an access opening being defined by the housing and the body and extending along a length direction of the body, and the access opening being located at front of the body;
a card holder positioned in the containing space and having at least one accommodating space communicated with the containing space, the terminals being exposed in the accommodating space, the card holder being capable of moving forward and backward in the containing space; and
an adjusting element, comprising a positioning portion arranged for positioning the adjusting element in the front of the card connector, an actuating portion, and an operation portion, when the operation portion being driven, the actuating portion actuating the card holder forward, thereby the card holder exiting from the containing space;
wherein the card holder has a cooperating portion on the bottom thereof, the actuating portion corresponding with the cooperating portion is formed by extending from one end of the positioning portion, and the cooperating portion is driven by the actuating portion.

31. A card connector, comprising:
a body;
multiple terminals accommodated and positioned in the body, each of the terminals having a contacting portion;
a housing covering the body, a containing space with an access opening being defined by the housing and the body and extending along a length direction of the body, and the access opening being located at front of the body;
a card holder positioned in the containing space and having at least one accommodating space communicated with the containing space, the terminals being exposed in the accommodating space, the card holder being capable of moving forward and backward in the containing space; and
an adjusting element, comprising a positioning portion arranged for positioning the adjusting element in the front of the card connector, an actuating portion, and an operation portion, when the operation portion being driven, the actuating portion actuating the card holder forward, thereby the card holder exiting from the containing space;
wherein the operating portion further comprises a pushing portion, which is formed by extending upward relative to the positioning portion.

32. The card connector according to claim 31, wherein the housing comprises two side walls, the pushing portion is formed at an acute angle to the side wall in a overhead view.

33. The card connector according to claim 31, wherein the operating portion further comprises a contacting portion, the contacting portion is formed by extending upward from one end of the positioning portion, and the pushing portion is formed by extending from one end of the contacting portion at a predetermined angle relative to the contacting portion.

34. The card connector according to claim 33, wherein the contacting portion is perpendicular to the pushing portion.

* * * * *